US009298031B2

(12) United States Patent
Han et al.

(10) Patent No.: US 9,298,031 B2
(45) Date of Patent: Mar. 29, 2016

(54) WIRE MESH TYPE DIFFUSER PLATE AND METHOD OF FABRICATING THE SAME, AND LIQUID CRYSTAL DISPLAY DEVICE HAVING THE WIRE MESH TYPE DIFFUSER PLATE

(71) Applicant: LG Display Co., Ltd., Seoul (KR)

(72) Inventors: YoungBae Han, Gyeongsangbuk-Do (KR); SunHye Kang, Gwangju (KR)

(73) Assignee: LG Display Co., Ltd., Seoul (KR)

( * ) Notice: Subject to any disclaimer, the term of this patent is extended or adjusted under 35 U.S.C. 154(b) by 13 days.

(21) Appl. No.: 13/726,939

(22) Filed: Dec. 26, 2012

(65) Prior Publication Data

US 2014/0111742 A1    Apr. 24, 2014

(30) Foreign Application Priority Data

Oct. 22, 2012    (KR) .................. 10-2012-0117480

(51) Int. Cl.
*G02F 1/1335*    (2006.01)
*G02B 5/02*    (2006.01)

(52) U.S. Cl.
CPC ........ *G02F 1/133504* (2013.01); *G02B 5/0205* (2013.01); *G02B 5/0268* (2013.01); *G02B 5/0278* (2013.01); *G02F 1/133606* (2013.01)

(58) Field of Classification Search
CPC ............. G02F 1/133606; G02F 1/133504; G02B 5/0205; G02B 5/0268; G02B 5/0278
USPC ......................................................... 349/64
See application file for complete search history.

(56) References Cited

U.S. PATENT DOCUMENTS

| 4,152,618 | A | * | 5/1979 | Abe et al. ...................... 313/116 |
| 5,520,986 | A | * | 5/1996 | Wang ............................. 428/131 |
| 8,267,543 | B2 | * | 9/2012 | Park .............................. 362/241 |

(Continued)

FOREIGN PATENT DOCUMENTS

| CN | 1961179 A | 5/2007 |
| JP | 6-102506 | 4/1994 |

(Continued)

OTHER PUBLICATIONS

Japanese Office Action dated Feb. 4, 2014 for corresponding Patent Application No. 2012-286540.

(Continued)

*Primary Examiner* — Michael Caley
*Assistant Examiner* — Ryan Crockett
(74) *Attorney, Agent, or Firm* — Morgan, Lewis & Bockius LLP (57) ABSTRACT

Disclosed are a wire mesh type diffuser plate, a method of fabricating the same, and a liquid crystal display device having the same. A film type diffuser plate having predetermined tension is fabricated through traction by using a wire mesh instead of a diffuser plate based on an existing extruding method to improve egg mura generated in a backlight unit. The liquid crystal display device includes: a liquid crystal panel displaying an image; a plurality of lamps installed below the liquid crystal panel and providing light to the liquid crystal panel; a plurality of optical sheets installed between the plurality of lamps and the liquid crystal panel; a reflection plate installed below the plurality of lamps; and a diffuser plate formed of a wire mesh having predetermined tension and installed between the plurality of lamps and the optical sheet and having predetermined tension.

13 Claims, 7 Drawing Sheets

(56) References Cited

U.S. PATENT DOCUMENTS

| | | | |
|---|---|---|---|
| 2001/0035926 A1* | 11/2001 | Yamaguchi et al. | 349/65 |
| 2010/0053748 A1* | 3/2010 | Rohner | G03B 21/62 359/460 |
| 2012/0105764 A1* | 5/2012 | Yokota | 349/61 |
| 2012/0140464 A1* | 6/2012 | Huang et al. | 362/235 |

FOREIGN PATENT DOCUMENTS

| | | | |
|---|---|---|---|
| JP | 2001242309 | | 9/2001 |
| JP | 2005-201938 | * | 7/2005 |
| JP | 2006018104 A | | 1/2006 |
| JP | 2006312658 A | | 11/2006 |
| JP | 2009-545767 | | 12/2009 |
| TW | 200727024 A | | 7/2007 |
| WO | 94/06051 | | 3/1994 |
| WO | 2005/116518 | | 12/2005 |
| WO | 2007/046274 A1 | | 4/2007 |
| WO | 2008/016242 | | 2/2008 |
| WO | 2009/041278 A1 | | 4/2009 |

OTHER PUBLICATIONS

Notice of Allowance dated Jun. 10, 2014 from the Japanese Intellectual Property Office in counterpart Japanese patent application No. 2012-286540.

Communication dated Jul. 3, 2014 from the European Patent Office in counterpart EPO patent application No. 12197007.3-1903 / 2722708.

Chinese Office Action issue in Chinese Patent Application No. 201210599233.9 on Oct. 30, 2015.

* cited by examiner

WIRE MESH TYPE DIFFUSER PLATE AND METHOD OF FABRICATING THE SAME, AND LIQUID CRYSTAL DISPLAY DEVICE HAVING THE WIRE MESH TYPE DIFFUSER PLATE

CROSS-REFERENCE TO RELATED APPLICATION

Pursuant to 35 U.S.C. §119(a), this application claims the benefit of earlier filing date and right of priority to Korean Application No. 10-2012-0117480, filed on Oct. 22, 2012, the contents of which is incorporated by reference herein in its entirety.

BACKGROUND OF THE INVENTION

1. Field of the Invention

The present disclosure relates to a wire mesh type diffuser plate and a liquid crystal display device having the same, and particularly, to a wire mesh type diffuser plate used in a direct type backlight unit, a method of fabricating the same, and a liquid crystal display device having the same.

2. Related art of the Invention

A liquid crystal display (LCD) device is a display device in which data signals according to image information are individually supplied to pixels arranged in a matrix form and light transmittance of the pixels is adjusted to display a desired image.

Thus, the LCD device includes a liquid crystal panel in which pixels are arranged in a matrix form and a driving unit for driving the pixels.

The liquid crystal panel includes a color filter substrate and an array substrate attached in a facing manner with a uniform cell gap maintained therebetween, and a liquid crystal layer formed in the cell gap between the color filter substrate and the array substrate.

Here, a common electrode and a pixel electrode are formed on the liquid crystal panel formed by attaching the color filter substrate and the array substrate to apply an electric field to the liquid crystal layer.

Thus, in a state in which a voltage is applied to the common electrode, when a voltage of a data signal applied to the pixel electrode is controlled, liquid crystal of the liquid crystal layer rotates by dielectric anisotropy according to an electric field between the common electrode and the pixel electrode, thereby displaying characters or images by transmitting or blocking light by pixels.

Here, the LCD device is a light receiving device that does not emit light by itself. That is, because the LCD device displays an image by adjusting transmittance of light coming from the outside, it requires a backlight unit.

A related art LCD device will be described in detail with reference to the accompanying drawings.

Figure 1:
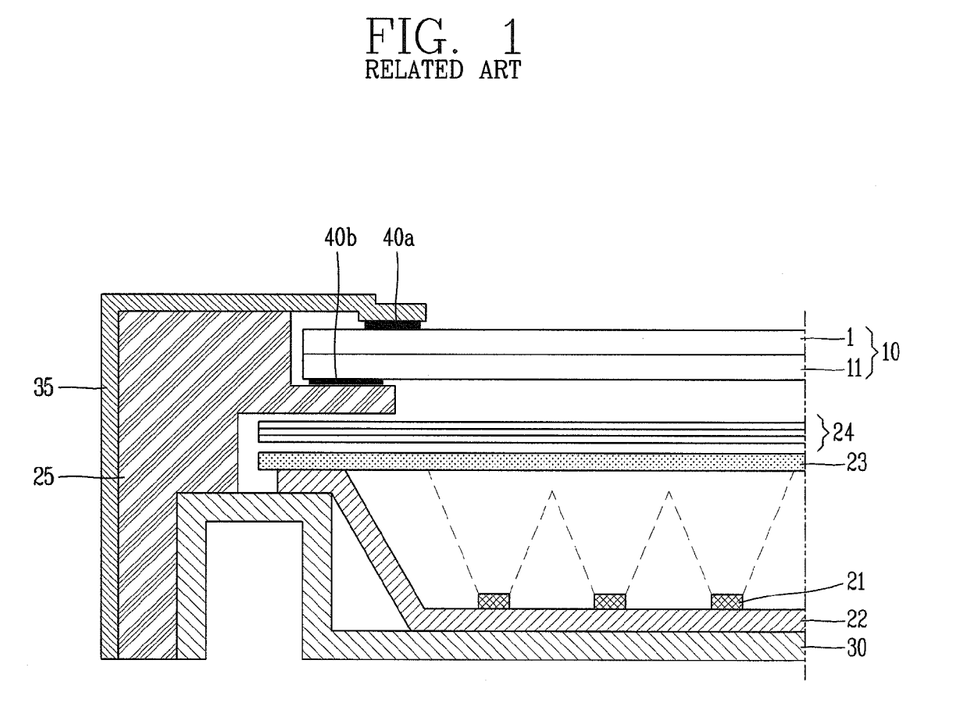
FIG. 1 illustrates a sectional view schematically showing a partial structure of a related art liquid crystal display device.

FIG. 1 illustrates a sectional view schematically showing a portion of a structure of a related art LCD device.

As illustrated, a related art LCD device includes a liquid crystal panel 10 on which pixels are arranged in a matrix form to output an image, a driving unit (not shown) for driving the pixels, a backlight unit installed on a rear surface of the liquid crystal panel 10 to emit light to a front surface of the liquid crystal panel 10, and a panel guide 25 receiving the liquid crystal panel 10 and the backlight unit and fixing them.

Here, the liquid crystal panel 10 includes a color filter substrate 1 and an array substrate 11 attached in a facing manner with a uniform cell gap maintained therebetween, and a liquid crystal layer formed in the cell gap between the color filter substrate 1 and the array substrate 11.

Although not illustrated, a common electrode and a pixel electrode are formed on the liquid crystal panel 10 formed by attaching the color filter substrate 1 and the array substrate 11 to apply an electric field to the liquid crystal layer. In a state in which a voltage is applied to the common electrode, when a voltage of a data signal applied to the pixel electrode is controlled, liquid crystal of the liquid crystal layer rotates by dielectric anisotropy according to an electric field between the common electrode and the pixel electrode, thereby displaying characters or images by transmitting or blocking light by pixels.

In order to control a voltage of a data signal applied to the pixel electrode by pixels, a switching element such as a thin film transistor (TFT) is individually provided in the pixels.

Upper and lower polarization plates (not shown) are attached to an outer side of the liquid crystal panel. The lower polarization plate polarizes light passing through the backlight unit, and the upper polarization plate polarizes light passing through the liquid crystal panel 10.

The backlight unit used as a light source of the liquid crystal panel is classified into an edge type backlight unit and a direct type backlight unit according to a method of disposing a light emitting lamp.

In the direct type backlight unit, a light emitting lamp 21 is disposed below the liquid crystal panel 10 to supply light. In detail, in the direct type backlight unit, a plurality of lamps 21 are disposed as light sources, and a reflector 22 is positioned under the plurality of lamps 21. A plurality of optical sheets 24 are laminated and positioned above the plurality of lamps 21.

Here, because the direct type backlight unit does not use a light guide plate, a diffuser plate 23 is provided between the plurality of lamps 21 and the optical sheets 24 in order to diffuse light of the lamps and support the optical sheets 24.

Also, although not illustrated, a conical fixing support is provided in order to support the diffuser plate 23 and the optical sheets 24 provided in the upper portion of the lamps 21.

The liquid crystal panel 10 including the color filter substrate 1 and the array substrate 11 is mounted through the panel guide 25 in an upper portion of the backlight unit configured as described above. The liquid crystal panel 10, the panel guide 25, and the backlight unit are coupled by a lower cover bottom 30 and an upper case top 35 through a plurality of fastening units 40a and 40b to form an LCD device.

As a material of the diffuser plate 23, polymethacryl styrene (MS), polystyrene (PS), polycarbonate (PC), or the like, is mainly used, and tolerance to thermal deformation and moisture and UV stability are required.

Figure 2:
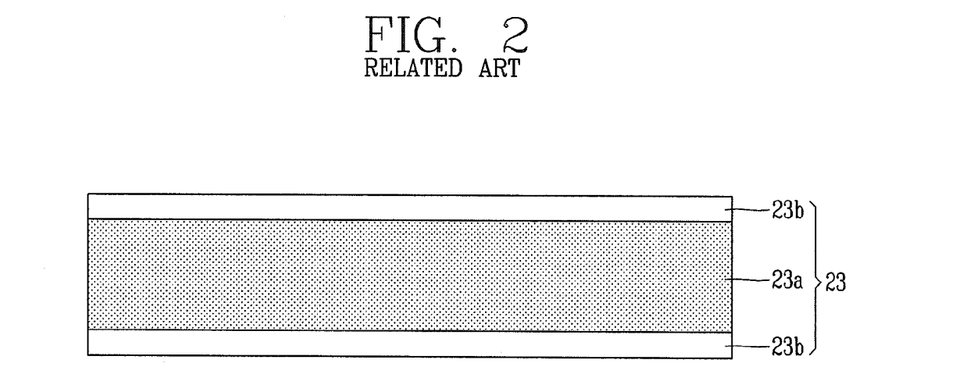
FIG. 2 illustrates a sectional view showing a structure of a related art diffuser plate illustrated in FIG. 1, for example.

FIG. 2 illustrates a sectional view showing a structure of a related art diffuser plate shown in FIG. 1, for example.

As shown in the drawing, for example, an existing diffuser plate 23 has a tri-layer structure in which plastic called polymetacryl styrene 23b is provided on both sides of polystyrene 23a provided in the middle portion.

The diffuser plate 23 is fabricated through an extruding method. A polymer chip as a raw material is put in an extruder, discharged through a T-die, and then, passes through a roll so as to be fabricated.

The diffuser plate 23 has a thickness of 1.2 mm, 1.5 mm, 2.0 mm, or the like, and the thickness of the diffuser plate 23 is increased as an application inch of a liquid crystal panel is increased in order to secure reliability.

The fabricated diffuser plate 23 is deformed due to moisture absorption, generating egg mura in the liquid crystal panel.

Figure 3A:
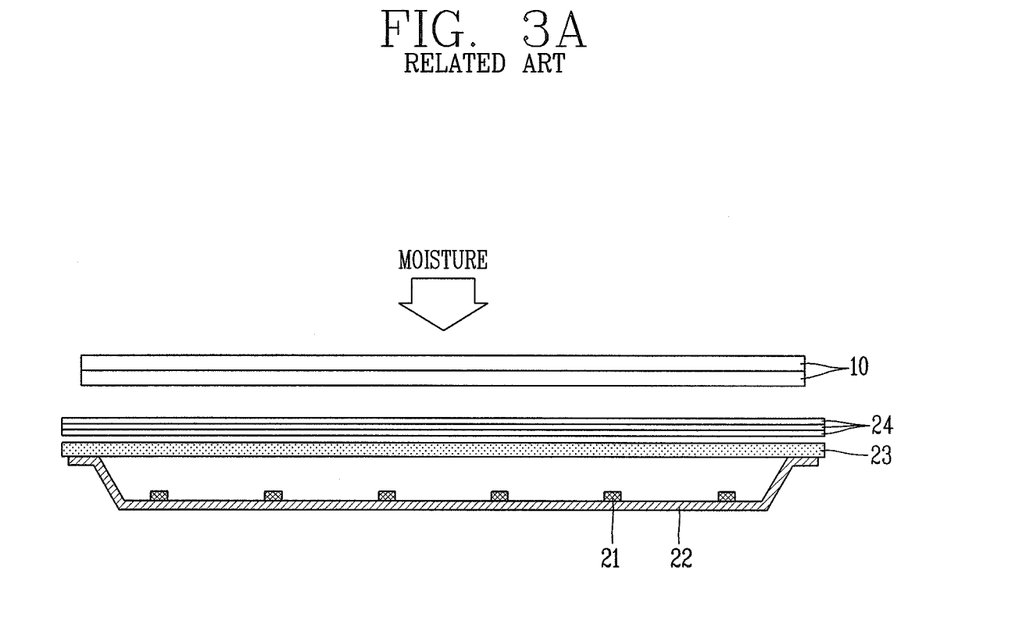
FIGS. 3A and 3B illustrate sectional views a mechanism of generating egg mura.
Figure 3B:
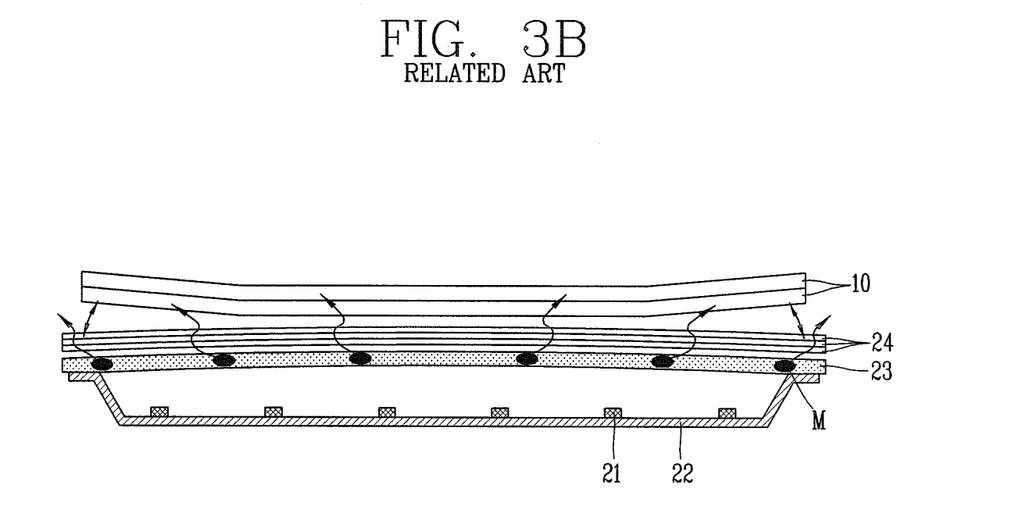

FIGS. 3A and 3B illustrates sectional views showing a mechanism of generating egg mura.

With reference to these drawings, in the case of the direct type backlight unit, because the lamp 21 as a light source exists below the diffuser plate 23, the lower side has a high temperature and the liquid crystal panel 10 side has a low temperature, so a temperature difference between the spaces generate moisture M.

Here, the diffuser plate 23 absorbs the moisture M so as to be expanded toward the liquid crystal panel 10, and the expansion of the diffuser plate 23 lifts the surface of edges of the liquid crystal panel 10 to generate egg mura having an egg shape. Moisture M in a surrounding environment also makes the same influence.

That is, because the polarization plate, the optical sheets 24, and the diffuser plate 23 absorb moisture M in a high temperature and high moisture environment, when the backlight unit is driven, the liquid crystal panel 10, the optical sheets 24, and the diffuser plate 23 are warped. Here, a contact portion and a non-contact portion exist between the lower polarizer plate and the optical sheets 24, and due to a different in moisture evaporation between the contact portion and the non-contact portion, the spots in the form of an egg mura are formed in the liquid crystal panel 10.

In order to improve this, the diffuser plate 23 is required to have a predetermined thickness, which makes it difficult to implement a slim design.

Also, when the thickness of the diffuser plate 23 is reduced, a resin flows down, non-molding, or the like, are generated in terms of the characteristics of the existing extruding process, having a limitation in reducing the thickness of the diffuser plate 23. That is, the thickness of the diffuser plate 23 is determined by passing a polishing roller during extruding, and in order to prevent a generation of non-molding, a predetermined thickness of the diffuser plate 23 should be maintained.

SUMMARY OF THE INVENTION

Therefore, an aspect of the detailed description is to provide a wire mesh type diffuser plate improving egg mura generated in a direct type backlight unit, a method of fabricating the same, and a liquid crystal display device having the same.

Other objects and features of the present invention will be described in the configuration and claims of the present invention hereinafter.

To achieve these and other advantages and in accordance with the purpose of this specification, as embodied and broadly described herein, a liquid crystal display device includes: a liquid crystal panel displaying an image; a plurality of lamps installed below the liquid crystal panel and providing light to the liquid crystal panel; a plurality of optical sheets installed between the plurality of lamps and the liquid crystal panel; a reflection plate installed below the plurality of lamps; and a diffuser plate formed of a wire mesh having predetermined tension and installed between the plurality of lamps and the optical sheet and having predetermined tension.

The wire mesh may use synthetic fiber such as transparent polyester, nylon, or the like, or stainless steel (SUS) as thread.

The wire mesh may be formed through a plain weave mesh method or twill weave mesh method.

The diffuser plate may form an emulsion coated portion by coating an emulsion on the entire surface thereof or coating an emulsion on the outermost portion thereof.

Here, the emulsion may be a diazo-based emulsion or a diazo dual cure-based emulsion.

The emulsion may be coated to have a thickness of 1.5~2 times a wire diameter of a wire mesh.

A wire diameter of the wire mesh has a value of about 10 μm~120 μm.

In the diffuser plate, a ratio of an opened region of the entire wire mesh may have a value of 30~90%.

A method of fabricating a wire mesh type diffuser plate includes: fabricating a wire mesh according to a plane weave mesh method or twill weave mesh method and providing tension through traction of pulling the wire mesh several times until when the tension reaches predetermined tension to fabricate a large base diffuser plate; measuring tension to inspect whether it has reached pre-set tension; coating an emulsion on the outermost portion of the traction-completed base diffuser plate by a desired size of a unit diffuser plate and drying it; and cutting the base diffuser plate into a plurality of unit diffuser plates.

The wire mesh may use synthetic fiber such as transparent polyester, nylon, or the like, or stainless steel (SUS) as thread.

Here, the emulsion may be a diazo-based emulsion or a diazo dual cure-based emulsion.

The emulsion may be coated to have a thickness of 1.5~2 times a wire diameter of a wire mesh.

A wire diameter of the wire mesh may have a value of about 10 μm~120 μm.

As described above, in the wire mesh type diffuser plate, the method of fabricating the same, and the liquid crystal display device having the same according to the present invention, a film type diffuser plate having predetermined tension is fabricated through traction by using a wire mesh instead of an existing diffuser plate based on an extruding method, and thus, egg mura generated in the direct type backlight unit can be improved.

Thus, a thickness of the backlight unit can be reduced to contribute to making the display device slim and improvement of quality and a screen grade, and also, because cost for a raw material of the diffuser plate is reduced, fabrication cost of the liquid crystal display device can be reduced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

A wire mesh type diffuser plate, a method of fabricating the same, and a liquid crystal display device having the same according to embodiments of the present invention will be described in detail with reference to the accompanying drawings such that a person skilled in the art can easily implement the same. The present invention may be implemented in various forms and not limited to the embodiments described herein.

Figure 4:
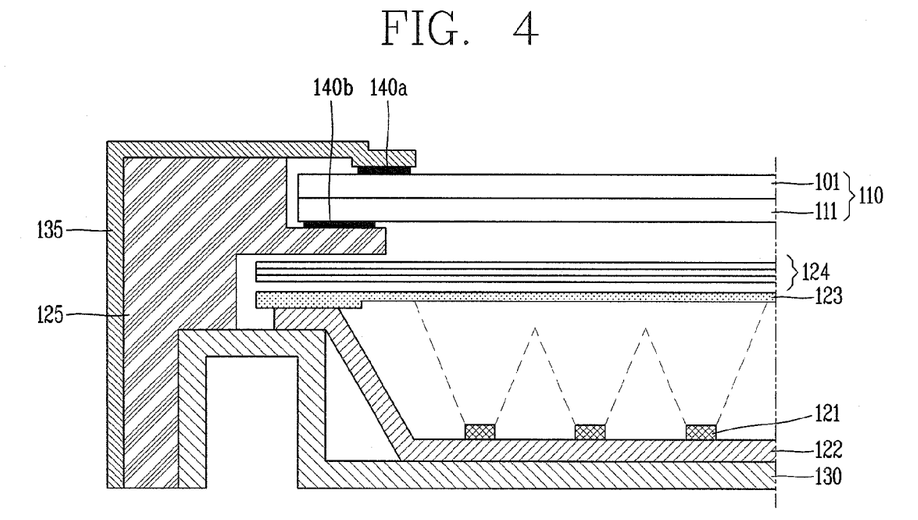
FIG. 4 illustrates a sectional view schematically showing a partial structure of a liquid crystal display device according to an embodiment of the present invention.

FIG. 4 illustrates a sectional view schematically showing a partial structure of a liquid crystal display device according to an embodiment of the present invention.

As illustrated in the drawing, the liquid crystal display (LCD) device according to an embodiment of the present invention includes a liquid crystal panel 110 in which pixels are arranged in a matrix form to output an image, a driving unit (not shown) for driving the pixels, a backlight unit installed on a rear surface of the liquid crystal panel 110 to emit light to a front surface of the liquid crystal panel 110, and a panel guide 125 for receiving the liquid crystal panel 110 and the backlight unit and fixing them.

Here, the liquid crystal panel 110 includes a color filter substrate 101 and an array substrate 111 attached in a facing manner with a uniform cell gap maintained therebetween, and a liquid crystal layer formed in the cell gap between the color filter substrate 101 and the array substrate 111.

Here, although not shown in detail, the color filter substrate 101 includes color filters including a plurality of sub-color filters implementing red, green, and blue colors, black matrices partitioning the sub-color filters and blocking light transmitted through the liquid crystal layer, and a transparent common electrode applying a voltage to the liquid crystal layer.

Also, the array substrate 111 includes a plurality of gate lines and data lines arranged vertically and horizontally to define a plurality of pixel regions, thin film transistors as switching elements formed in intersections of the gate lines and data lines, and a pixel electrode formed on the pixel region. Here, in case of an in-plane switching (IPS) mode LCD device, a common electrode is formed on the array substrate 111 instead of the color filter substrate 101.

A common electrode and a pixel electrode are formed on the liquid crystal panel 110 in which the color filter substrate 101 and the array substrate 111 are attached to apply an electric field to the liquid crystal layer, and when a voltage of a data signal applied to the pixel electrode in a state that a voltage is applied to the common electrode is controlled, liquid crystal of the liquid crystal layer is rotated by dielectric anisotropy according to the electric field between the common electrode and the data electrode, whereby light is transmitted or blocked by pixels to display a character or an image.

In order to control a voltage of the data signal applied to the pixel electrode by pixels, a switching element such as a thin film transistor is individually provided in the pixels.

Upper and lower polarization plates (not shown) are attached to an outer side of the liquid crystal panel 110, and the lower polarization plate polarizes light passing through the backlight unit and the upper polarization plate polarizes light passing through the liquid crystal panel 110.

Here, the upper and lower polarization plates are optical means for converting natural light or polarized light into linearly polarized light. The upper and lower polarization plates separate incident light into two polarization components perpendicular to each other, and allows one polarization component to be transmitted therethrough and absorbs, reflects and/or diffuses the other polarization component.

A thickness of the upper and lower polarization plates is not particularly limited and includes a general concept of a thin film, a film, or a sheet.

A direct type backlight unit according to an embodiment of the present invention will be described in detail. A plurality of lamps 121 are disposed as lamps, and a reflective plate 122 is positioned below the plurality of lamps 121. A plurality of optical sheets 124 are stacked and positioned above the plurality of lamps 121.

The optical sheets 124 according to an embodiment of the present invention may include a diffusion sheet and a prism sheet, and may additionally include a protective sheet.

Here, because the direct type backlight unit does not use a light guide plate, a diffuser plate 123 is provided between the plurality lamps 121 and the optical sheet 124 in order to diffuse light of the lamps and support the optical sheets 124.

The liquid crystal panel 110 including the color filter substrate 101 and the array substrate 111 is mounted on an upper portion of the backlight unit configured as described above through the panel guide 125, and the liquid crystal panel 110, the panel guide 125, and the backlight unit are combined with each other by a lower cover bottom 130 and an upper case top 135 through a plurality of fastening units 140a and 140b to form an LCD device.

Here, the diffuser plate 123 according to an embodiment of the present invention has characteristics that a film type diffuser plate using a wire mesh instead of a diffuser plate of an existing extruding method is applied.

The wire mesh type diffuser plate 123 is fabricated as a film type having predetermined tension in order to cope with a change in a surrounding environment and dimensions when it is applied as a substitute of an existing diffuser plate.

Figure 5A:
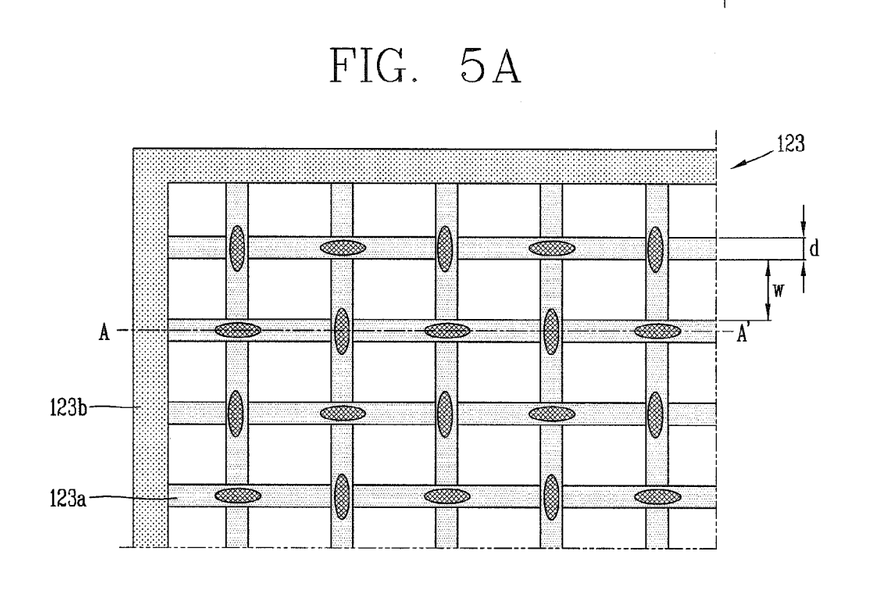
FIGS. 5A and 5B illustrate a plan view and a sectional view showing, for example, a wire mesh type diffuser plate in the liquid crystal display device according to an embodiment of the present invention illustrated in FIG. 4.
Figure 5B:
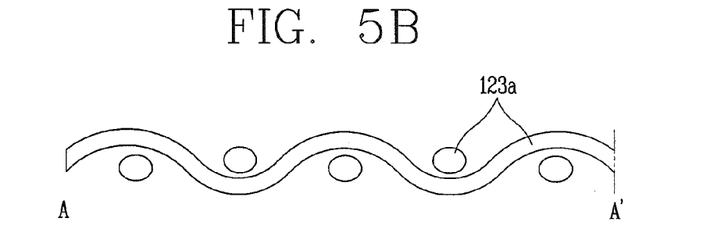

FIGS. 5A and 5B illustrate a plan view and a sectional view showing, for example, a wire mesh type diffuser plate in the liquid crystal display device according to an embodiment of the present invention illustrated in FIG. 4.

With reference to these drawings, a wire mesh 123a is fabricated by using synthetic fiber such as transparent polyester, nylon, or the like, or stainless steel (SUS) as thread according to a plain weave mesh method or twill weave mesh method.

Thereafter, tension is provided through traction of pulling the wire mesh several times until when the tension reaches predetermined tension.

Here, the polyester fiber has strength second stronger than nylon when pulled, and its strength is not changed even when it is wet in water. Nylon is a general name of polyamide-based synthetic fiber, and it is thinner than a web and resistant to friction, and has excellent tensile strength relative to other fibers.

The plane weave mesh is the most basic tissue in which warp and weft are alternately crossed, and the wire mesh type diffuser plate 123 fabricated according to the plain weave mesh method has a minimized contact area with the optical sheets of the backlight unit to prevent abrasion of the optical sheets, and reduce static electricity.

The wire mesh type diffuser plate 123 according to an embodiment of the present invention fabricated to have predetermined tension can improve egg mura generated in the direct type backlight unit, unlike the existing diffuser plate. Thus, a thickness of the backlight unit can be reduced to contribute to a slim display device and quality enhancement and screen grade enhancement, and because cost for a raw material of the diffuser plate is reduced, fabrication cost of the LCD device can be reduced.

Also, unlike the existing diffuser plate, a fixing support for supporting the wire mesh type diffuser plate 123 and the optical sheets is not required.

Here, in order to maintain tension of the wire mesh 123*a* and serve as a frame, an emulsion may be coated on the entire surface of the wire mesh type diffuser plate 123 or an emulsion may be coated on the outermost portion of the wire mesh type diffuser plate 123 to form an emulsion coated portion 123*b*.

The emulsion coated portion 123*b* is placed in edges of the reflective plate and supported between the reflective plate and the optical sheets, so tension can be maintained.

Electrooptical characteristics of the wire mesh type diffuser plate 123 according to an embodiment of the present invention may be controlled by adjusting an opening w and a wire diameter (thickness) d of the wire mesh 123. Also, the electrooptical characteristics of the wire mesh type diffuser plate 123 may be controlled by adjusting transparency of a material forming the wire mesh 123*a*.

Here, an open area may be indicated as a rate (%) of the opened region in the entire wire mesh 123*a*, and as the open area is reduced, transmittance is reduced, and as the open area is increased, transmittance is increased.

The open area of the wire mesh 123*a* may have a value of about 30~90%.

Meanwhile, the method for fabricating the wire mesh according to an embodiment of the present invention is not limited to the plain weave mesh method as described above, and the wire mesh may be fabricated according to a twill weave mesh method. This will be described in detail with reference to the following drawings.

Figure 6A:
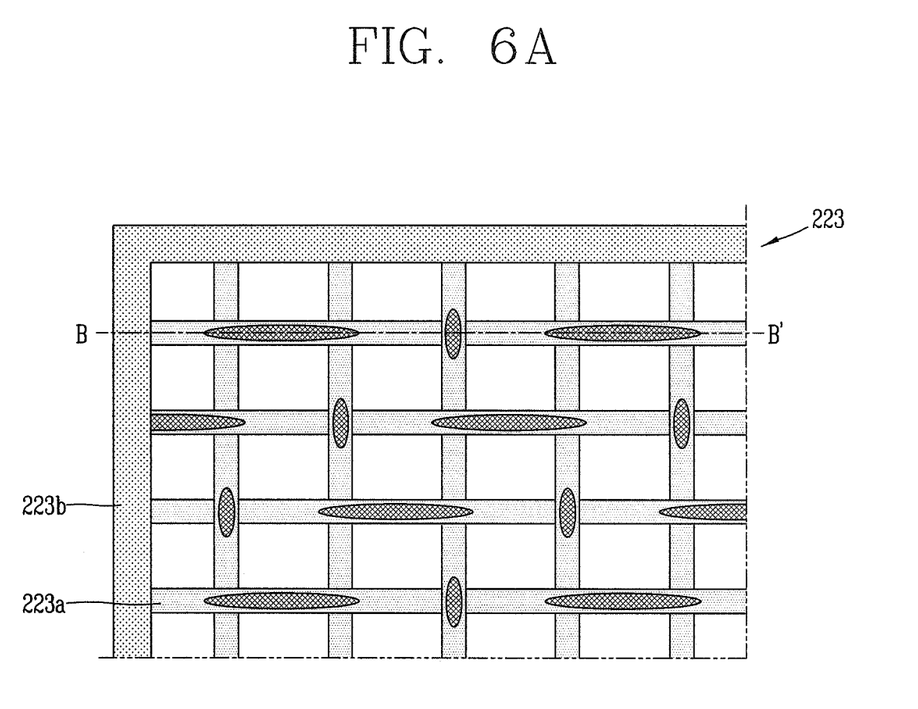
FIGS. 6A and 6B are a plan view and a sectional view showing, for example, a different wire mesh type diffuser plate in the liquid crystal display device according to an embodiment of the present invention illustrated in FIG. 4.
Figure 6B:
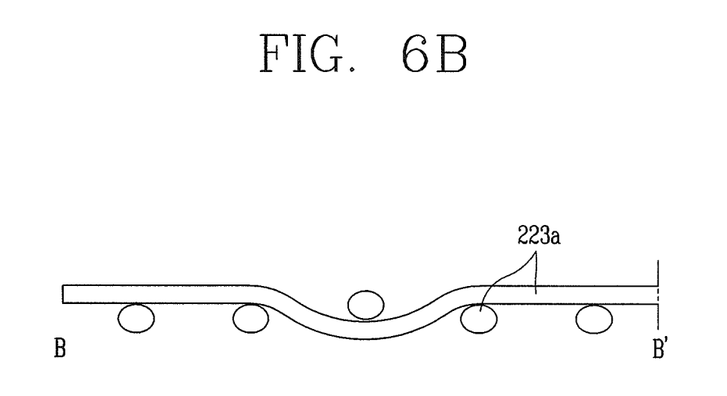

FIGS. 6A and 6B are a plan view and a sectional view showing, for example, a different wire mesh type diffuser plate in the liquid crystal display device according to an embodiment of the present invention illustrated in FIG. 4.

With reference to these drawings, a wire mesh 223*a* is fabricated according to a twill weave mesh method by using synthetic fiber such as transparent polyester, nylon, or the like, or stainless steel (SUS) as thread.

Thereafter, tension is provided to the wire mesh through traction of pulling the wire mesh several times until when the tension reaches predetermined tension.

The weave mesh is a tissue forming a furrow pattern in a comb direction with warp and weft on a surface of fabric, and the wire mesh type diffuser plate 223 fabricated according to the twill weave mesh method has an increased contact area with the optical sheets compared with the plain weave mesh method as described above but has a smooth surface and thus it is more advantageous for preventing abrasion of the optical sheets.

Unlike the existing diffuser plate, the wire mesh type diffuser plate 223 according to an embodiment of the present invention fabricated to have predetermined tension as described above advantageously does not require a fixing support for supporting the diffuser plate 223 and the optical sheets.

Here, in order to maintain the tension of the wire mesh 223*a* and to make the wire mesh 223*a* serve as a frame, an emulsion may be coated on the entire surface of the wire mesh type diffuser plate 223 or an emulsion may be coated on the outermost portion of the wire mesh type diffuser plate 223 to form the emulsion coated portion 223*b*.

A method for fabricating a wire mesh type diffuser plate according to an embodiment of the present invention configured as described above will be described in detail with reference to the accompanying drawings.

Figure 7:
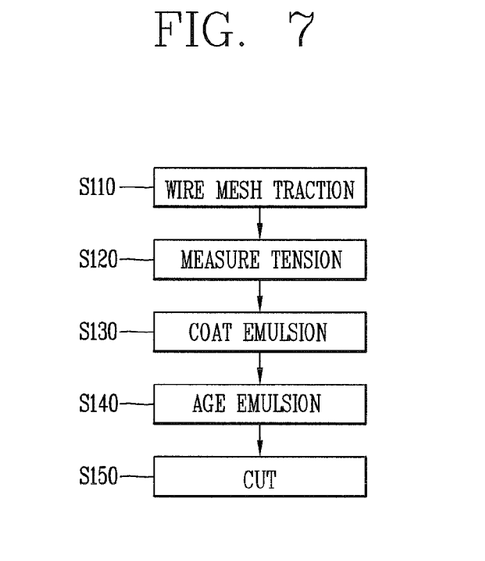
FIG. 7 is a flow chart illustrating a sequential fabrication process of the wire mesh type diffuser plate according to an embodiment of the present invention.

FIG. 7 is a flow chart illustrating a sequential fabrication process of the wire mesh type diffuser plate according to an embodiment of the present invention.

Figure 8:
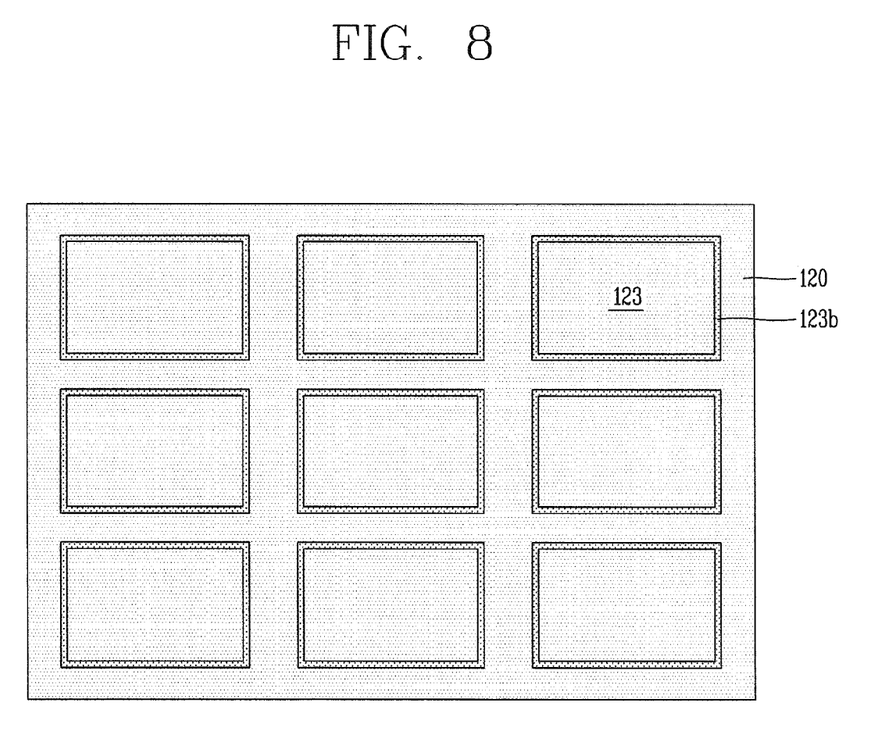
FIG. 8 is a plan view illustrating, for example, a state that a plurality of unit wire mesh type diffuser plates are divided on a large base diffuser plate.

Also, FIG. 8 is a plan view illustrating, for example, a state that a plurality of unit wire mesh type diffuser plates are divided on a large base diffuser plate.

First, a wire mesh is fabricated according to a plain weave mesh method by using synthetic fiber such as transparent polyester, nylon, or the like, or stainless steel as thread and tension is provided to the wire mesh through traction of pulling the wire mesh several times until when the tension reaches predetermined tension (S110).

Here, since the wire mesh is a film type, it may be cut by inches to provide tension when fastened to the lower cover, and in this case, pressure applied to the wire mesh should be uniformly maintained.

As described above, the plain weave mesh is the most basic tissue in which warp and weft are alternately crossed, and the wire mesh type diffuser plate fabricated according to the plain weave mesh method has a minimized contact area with the optical sheets of the backlight unit to prevent abrasion of the optical sheets, and reduce static electricity.

Also, the weave mesh is a tissue forming a furrow pattern in a comb direction with warp and weft on a surface of fabric, and the wire mesh type diffuser plate 223 fabricated according to the twill weave mesh method has an increased contact area with the optical sheets compared with the plain weave mesh method as described above but has a smooth surface and thus it is more advantageous for preventing abrasion of the optical sheets.

Thereafter, tension is measured and it is inspected whether it has reached pre-set tension (S120).

Here, the wire mesh type diffuser plate according to an embodiment of the present invention is fabricated in a state that unit a plurality of wire mesh type diffuser plates 123 are divided on a large base diffuser plate 120, and fabricated through emulsion coating and certain cutting process (See FIG. 8).

That is, in order to fabricate the large base diffuser plate 120 which has been completed for traction as a single product, an emulsion is coated to the outermost portion by a desired size, aged, and cut into a plurality of unit wire mesh type diffuser plates 123 (S130, S140, S150).

Here, in order to maintain tension of the wire mesh and serve as a frame, the coated emulsion is required to have excellent water resistance, moisture resistance, solvent resistance, maintain mechanical rigidity, and have a short aging time after the emulsion is coated.

As the emulsion, a diazo-based emulsion may be used in case of fabricating a small size, and when the size is increased, a diazo dual cure-based emulsion may be used. Here, diazo is a compound including nitrogen and having good reactivity.

Figure 9A:
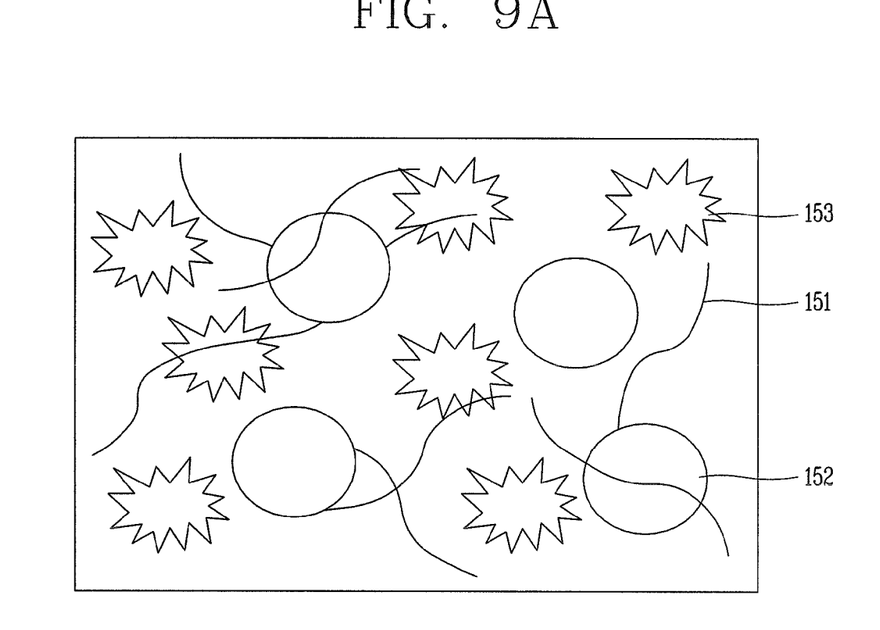
FIGS. 9A and 9B are schematic views showing an emulsion used in the wire mesh type diffuser plate according to an embodiment of the present invention.
Figure 9B:
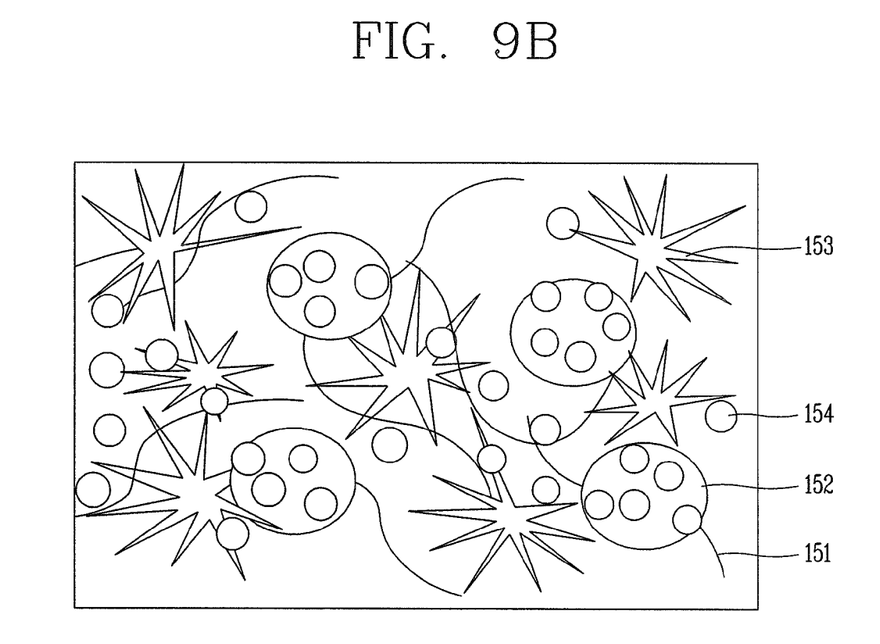

FIGS. 9A and 9B are schematic views showing an emulsion used in the wire mesh type diffuser plate according to an embodiment of the present invention.

Referring to FIG. 9A, the diazo-based emulsion may be an emulsion in which polyvinyl alcohol (PVA) 151, polyvinyl acetate (PVAC) 152, and diazo 153 are mixed, and a solvent-resistant emulsion or a water-resistant emulsion may be obtained according to a ratio of each component.

In the solvent-resistant emulsion, a ratio between the PVAC 152 and the PVA 151 is about 6:4, and in the water-resistant emulsion, a ratio between the PVAC 152 and the PVA 151 is about 2:8.

The PVA 151 is water-soluble and has a considerable solvent-resistance, and the PVAC 152 is solvent-soluable and has a considerable water-resistance.

Also, referring to FIG. 9B, the diazo dual cure-based emulsion is an emulsion in which an acrylic monomer 154 is mixed to the PVA 151, the PVAC 152, and the diazo 153.

The acrylic monomer 154 cross-bridges the respective components such that all the components are equal.

The emulsion may be coated to have a thickness of 1.5~2 times the wire diameter of the wire mesh. This is because 50~70% of the thickness of the coated emulsion is evaporated during an aging process after the emulsion is coated.

Here, the wire diameter of the wire mesh may have a value of about 10 μm~120 μm.

Electrooptical characteristics of the wire mesh type diffuser plate according to an embodiment of the present invention fabricated as described above may be controlled by adjusting the opening and the wire diameter (thickness) d of the wire mesh. Also, the electrooptical characteristics of the wire mesh type diffuser plate may be controlled by adjusting transparency of the wire mesh material.

Figure 10A:
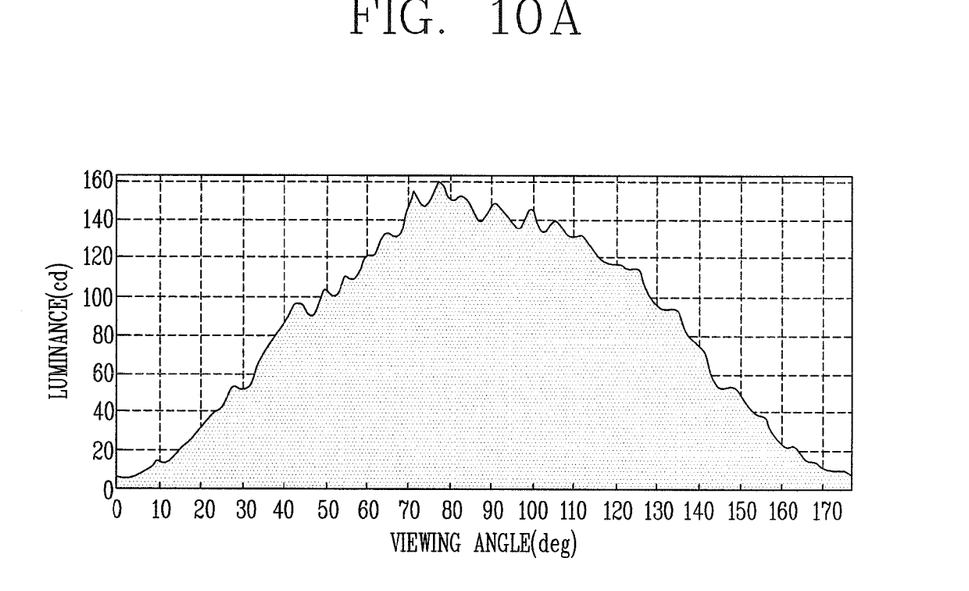
FIGS. 10A and 10B are graphs showing, for example, luminance characteristics according to a viewing angle.
Figure 10B:
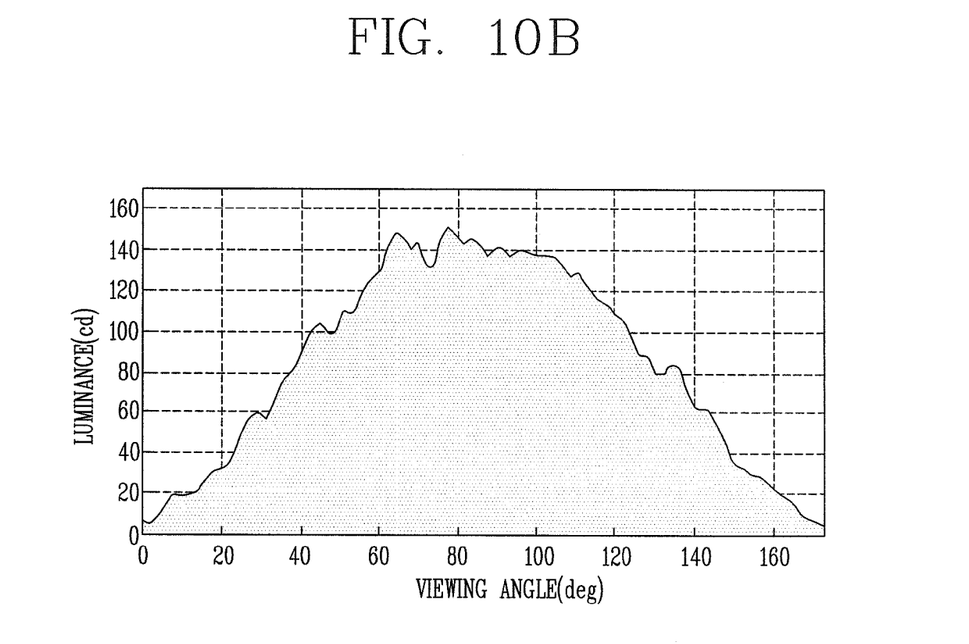

FIGS. 10A and 10B are graphs showing, for example, luminance characteristics according to a viewing angle.

Here, FIG. 10A shows an example of luminance characteristics according to a viewing angle in the diffuser plate based on the existing extruding method, and FIG. 10B shows an example of luminance characteristics according to a viewing angle in the wire mesh type diffuser plate according to an embodiment of the present invention.

With reference to the drawings, It is noted that even the wire mesh type diffuser plate according to an embodiment of the present invention has the same electrooptical characteristics as that of the diffuser plate based on the existing extruding method.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device comprising:
a liquid crystal panel;
a plurality of lamps installed below the liquid crystal panel;
a plurality of optical sheets installed between the plurality of lamps and the liquid crystal panel;
a reflection plate installed below the plurality of lamps; and
a diffuser plate of a wire mesh having predetermined tension and installed between the plurality of lamps and the optical sheets,
wherein the diffuser plate includes an emulsion coated portion coated with an emulsion at an outermost edge of the diffuser plate, and the emulsion coated portion maintains the predetermined tension and serves as a frame, and
wherein the emulsion coated portion is placed on edges of the reflection plate and supported between the reflection plate and the optical sheets.

2. The liquid crystal display device of claim 1, wherein the wire mesh uses synthetic fiber such as transparent polyester, nylon, or the like, or stainless steel (SUS) as thread.

3. The liquid crystal display device of claim 1, wherein the emulsion is a diazo-based emulsion or a diazo dual cure-based emulsion.

4. The liquid crystal display device of claim 1, wherein the emulsion coated portion has a thickness of 1.5~2 times a wire diameter of the wire mesh.

5. The liquid crystal display device of claim 4, wherein the wire diameter of the wire mesh has a value of about 10 μm~120 μm.

6. The liquid crystal display device of claim 1, wherein in the diffuser plate, a ratio of an opened region of the entire wire mesh has a value of 30~90%.

7. A wire mesh type diffuser plate comprising:
a diffuser plate of a wire mesh having predetermined tension; and
an emulsion coated portion coated with an emulsion at an outermost edge of the diffuser plate, wherein the emulsion coated portion maintains the predetermined tension and serves as a frame,
wherein the diffuser plate is installed between a plurality of lamps and optical sheets and
wherein the emulsion coated portion is placed on edges of a reflection plate and supported between the reflection plate and the optical sheets.

8. The diffuser plate of claim 7, wherein the wire mesh uses synthetic fiber such as transparent polyester, nylon, or the like, or stainless steel (SUS) as thread.

9. The diffuser plate of claim 7, wherein the emulsion is a diazo-based emulsion or a diazo dual cure-based emulsion.

10. The diffuser plate of claim 7, wherein the emulsion coated portion has a thickness of 1.5~2 times a wire diameter of the wire mesh.

11. The diffuser plate of claim 10, wherein the wire diameter of the wire mesh has a value of about 10 μm~120 μm.

12. The diffuser plate of claim 7, wherein in the diffuser plate, a ratio of an opened region of the entire wire mesh has a value of 30~90%.

13. The diffuser plate of claim 7, wherein the wire mesh is a plane weave mesh in which warp and weft are alternately crossed to have a minimized contact area with the optical sheets.

\* \* \* \* \*